(12) United States Patent
Klien et al.

(10) Patent No.: US 10,338,111 B2
(45) Date of Patent: Jul. 2, 2019

(54) METHOD OF MONITORING OPERATION OF AN ELECTRIC POWER SYSTEM AND MONITORING SYSTEM

(71) Applicant: Omicron Electronics GmbH, Klaus (AT)

(72) Inventors: Andreas Klien, Gotzis (AT); Cristian Marinescu, Dornbirn (AT)

(73) Assignee: Omicron Electronics GmbH, Klaus (AT)

( * ) Notice: Subject to any disclaimer, the term of this patent is extended or adjusted under 35 U.S.C. 154(b) by 221 days.

(21) Appl. No.: 13/969,829

(22) Filed: Aug. 19, 2013

(65) Prior Publication Data
US 2014/0058689 A1    Feb. 27, 2014

(30) Foreign Application Priority Data

Aug. 21, 2012 (EP) .................................... 12005971

(51) Int. Cl.
*H04L 12/26* (2006.01)
*H04L 29/06* (2006.01)
(Continued)

(52) U.S. Cl.
CPC ........ *G01R 21/133* (2013.01); *H04L 41/0631* (2013.01); *H04L 63/14* (2013.01);
(Continued)

(58) Field of Classification Search
CPC ........................................... Y04S 40/00–40/24
See application file for complete search history.

(56) References Cited

U.S. PATENT DOCUMENTS 8,804,547 B2  8/2014  Wimmer
2007/0050777 A1* 3/2007 Hutchinson ......... G06F 11/0709
                                                          718/104
(Continued)

FOREIGN PATENT DOCUMENTS

AU    2013205761 B2    7/2015
CN    101674246       3/2010
(Continued)

OTHER PUBLICATIONS

Hadeli Hadeli et al, "Generating Configuration for Missing Traffic Detector and Security Measures in Industrial Control Systems Based on the System Description Files", Technologies for Homeland Security 2009, HST '09, IEEE Conference on, IEEE, Piscataway, NJ, USA, May 11, 2009, pp. 503-510.

(Continued)

*Primary Examiner* — Alexander Satanovsky
*Assistant Examiner* — Brent A. Fairbanks
(74) *Attorney, Agent, or Firm* — Wood, Herron & Evans, LLP

(57) ABSTRACT

In a method, operation of an electric power system which has a power utility automation system (1981-1984, 1991-1994) is monitored. The power utility automation system (1981-1984, 1991-1994) comprises a plurality of intelligent electronic devices (IEDs) (1981-1984, 1991-1994) communicating via a communication network. During operation of the electric power system, properties of the electric power system are monitored, the monitored properties comprising monitored data messages which are transmitted by the plurality of IEDs (1981-1984, 1991-1994) over the communication network. The monitored data messages are evaluated based on configuration information for the power utility automation system (1981-1984, 1991-1994) to detect a (Continued)

critical event. An alert signal is generated in response to detection of the critical event.

10 Claims, 7 Drawing Sheets

(51) Int. Cl.
  *G01R 21/133* (2006.01)
  *H04L 12/24* (2006.01)
(52) U.S. Cl.
  CPC .............. *H04L 43/00* (2013.01); *H04L 43/12* (2013.01); *Y04S 40/166* (2013.01); *Y04S 40/168* (2013.01); *Y04S 40/24* (2013.01)

(56) References Cited

U.S. PATENT DOCUMENTS

| | | | | |
|---|---|---|---|---|
| 2011/0196627 | A1* | 8/2011 | Steinhauser | ............ H04L 43/08 702/58 |
| 2011/0288692 | A1* | 11/2011 | Scott | ........................ G06F 21/55 700/297 |
| 2012/0144187 | A1* | 6/2012 | Wei | ...................... H04L 63/0281 713/152 |
| 2012/0323381 | A1* | 12/2012 | Yadav | .................. H04L 63/0236 700/286 |
| 2014/0058689 | A1 | 2/2014 | Klien et al. | |

FOREIGN PATENT DOCUMENTS

| | | |
|---|---|---|
| EP | 1850447 | 10/2007 |
| EP | 2109204 | 10/2009 |
| EP | 2362577 | 8/2011 |
| EP | 2701340 B1 | 10/2017 |

OTHER PUBLICATIONS

IEEE Power Engineering Society, "IEEE Standard Test Method for Use in the Evaluation of Message Communications Between Intelligent Electronic Devices in an Integrated Substation Protection, Control, and Data Acquisition System", IEEE Std. C37.115-2003, IEEE Standard, IEEE, Piscataway, NJ, USA, Jun. 30, 2004, 82 pages.

* cited by examiner

METHOD OF MONITORING OPERATION OF AN ELECTRIC POWER SYSTEM AND MONITORING SYSTEM

FIELD OF THE INVENTION

The invention relates to a method and a monitoring system for monitoring operation of an electric power system. The invention relates in particular to such a method and monitoring system which is configured to perform substation automation monitoring to detect a critical event, such as a security intrusion, during operation of the electric power system.

BACKGROUND OF THE INVENTION

Electric power systems for high and medium voltages are widely used. The need to transmit power over longer distances, to perform voltage conversion in a transformer substation or to distribute power requires complex electric systems. In recent years, so-called automation systems have become increasingly popular which increase the degree of automation attained in an electric power system. For illustration, substations for power distribution in high and medium voltage power networks include primary or field devices such as electrical cables, lines, bus bars, switches, breakers, power transformers and instrument transformers arranged in switch yards and/or bays. These primary devices may be operated in an automated way via a Substation Automation (SA) system responsible for controlling, protecting and monitoring of substations. The SA system comprises programmable secondary devices, so-called Intelligent Electronic Devices (IED), interconnected in a SA communication network, and interacting with the primary devices via a process interface. Similarly, a wide variety of electric power systems may have an associated power utility automation system which includes IEDs that perform functions of controlling, protecting and monitoring operation of the respective electric power system. Communication between IEDs may be performed according to standardized protocols. For illustration, the IEC standard 61850 "Communication Networks and Systems in Substations" decouples the substation-specific application functionality from the substation communication-specific issues and to this end, defines an abstract object model for compliant substations, and a method how to access these objects over a network via an Abstract Communication Service Interface (ACSI).

With an increasing degree of automation and with increasing usage of IEDs, there is also an increasing need to reliably detect critical situations in the power automation system. Examples for such critical events include security intrusions, operator errors, timing issues, hardware faults or any critical or incorrect state of the electric power system and/or its power utility automation system.

US 2011/0196627 A1 describes methods and devices in which real-time data transmissions are detected and may be evaluated with regard to time-related information. Such an approach allows critical situations to be detected when, for example, communication protocols are used which require messages that are transmitted between IEDs to fulfil certain timing requirements.

In the field of computer networks, Intrusion Detection Systems (IDSs) are used to monitor the network or the activity of systems in order to detect intrusions or malicious activities of unauthorized third-parties. IDSs are designed to identify possible incidents, log information and report possible attempts. The primary function of IDSs is to alert the operator of the secured perimeter, so that he can take measures to prevent intrusion, to minimize the impacts of the attacks or to do post incident analysis. Signature-based IDSs use predefined signatures of known attacks (like virus scanner signatures) to detect intrusions. This can be seen as a blacklist approach, where the IDS alerts the operator if a behaviour is observed which is explicitly forbidden in the sense that it is included in the blacklist. Such signature-based approaches are widely used for IDSs in classical information technology (IT) systems. While the blacklist approach may be used to detect critical events in power utility automation systems, there may be problems associated with such an approach. The blacklist approach requires a signature for each critical event which is to be identified. New or unknown attacks cannot be detected. In the context of electric power systems, the number of attacks and vulnerabilities known for control and automation systems and their special protocols is very low. Therefore, blacklist based IDS applied to electric power systems would, to a great extent, only be able to detect attacks known from the IT domain. The usefulness of blacklist approaches is thus especially limited for IDS in electric power systems.

SUMMARY OF THE INVENTION

Accordingly, there is a need for a method and system for monitoring operation of an electric power system which has an associated power utility automation system, e.g. a substation automation system. There is also a need for such methods and systems which do not only rely on a list of signatures of critical events and thus may also detect new critical events which are not included in a blacklist.

According to embodiments, a method and a monitoring system as defined by the independent claims are provided. The dependent claims define embodiments.

A method of monitoring operation of an electric power system is performed by a monitoring system. The power system has a power utility automation system.

The power utility automation system comprises a plurality of intelligent electronic devices (IEDs) communicating via a communication network. The monitoring system uses configuration information that specifies properties of the plurality of IEDs. The method comprises, during operation of the electric power system, monitoring properties of the electric power system, the monitored properties comprising monitored data messages which are transmitted by the plurality of IEDs over the communication network. The method comprises evaluating the monitored data messages to detect a critical event during operation of the electric power system, wherein the evaluating comprises analyzing a data content of at least some of the monitored data messages to determine, based on the configuration information, whether the data content corresponds to a valid behaviour. The method comprises generating an alert signal in response to detection of non-conformant data or status of the system.

The method takes advantage of the fact that electric power systems and their automation systems are to a great extent deterministic. The number of devices, their addresses, protocols, and even the services performed by the electric power system as a whole are known beforehand and do not change much over time. Accordingly, configuration information which specifies the behaviour of the IEDs is used to determine whether the monitored system properties are in conformity with the configuration information. The monitoring system may verify, based on the monitored properties, whether the monitored properties comply with the configuration information. The monitoring system thus uses an approach which does not necessarily require a blacklist which includes signatures of critical events. Rather, the monitoring system uses the configuration information to verify, based on the configuration information, whether observed events are valid system behaviour. Thereby, the monitoring system identifies events which are not in conformity with a system model of the electric power system and its power utility automation system.

The electric power system may be or may include a substation.

The power utility automation system may be or may include a substation automation system.

The monitoring system may be configured to perform the monitoring of properties passively, without actively interfering with the operation of any one of the IEDs or components of the electric power system. The monitoring system may be configured such that it monitors the properties without outputting messages to one of the IEDs during operation of the electric power system.

The monitoring system may generate a system model for the electric power system and its power utility automation system based on the configuration information. The monitoring system may thus resemble a whitelist-based approach that uses an automatically generated system model for a power system with detailed behaviour specifications to judge whether monitored properties are in accordance with normal operation as defined by the behaviour specifications in the system model.

The monitoring system may generate the system model based on the configuration information and application knowledge. The application knowledge may include information on communication protocols used by the IEDs to communicate via the communication network. The application knowledge may include information on the operation of the communication protocol(s). The application knowledge may include information on when and which data is transmitted according to the communication protocol(s). The application knowledge may include information on data models of IEDs or other devices, respectively for plural different IEDs or devices. The application knowledge may include information on which functions are critical. The application knowledge may be stored in a database, from which the monitoring system retrieves information to generate the system model.

The generated system model should cover communication characteristics. The generated system model may define which IEDs communicate with each other and parameters of the respective communication. Additionally, the system model may also use application knowledge about the electric power system. Thereby, the monitoring system is also configured to analyze the data content of the transferred messages. The monitoring system may be configured to put data messages of different sources into relation. This may also include the observation of digitally transferred measurement values (e.g. voltages, signal waveforms, binary/trigger events, including, but not limited to IEC 61850 messages). Since automation systems often have real-time requirements, also time properties of the messages may be part of the system model. The system may not only inspect network traffic and measurement values transferred over the network, but may additionally have electrical (analogue) input ports to be able to compare electrical signals of the power system to the internal system model. Data contents of monitored data messages and electrical signals can then be brought into direct relation and may be compared against the system model. Application knowledge may be used to generate the system model.

The system model may further include information on logical interconnection between the IEDs. I.e., the system model may include information on the topology of the power utility automation system. The system model may further include information on switches which are used in the communication network. This allows the monitoring system to determine which data messages are expected at certain locations within the communication network for valid behaviour of the power utility automation system. The system model may include information on the capabilities of at least the IEDs in the power utility automation system. The system model may include information on the data messages transmitted by the IEDs.

The system model may have a format which defines a set of constraints which are imposed onto valid behaviour of the power utility automation system by the configuration information and/or application knowledge. The set of constraints may include constraints relating to the data messages expected at a certain location of the communication network for the given topology of the power utility automation system. For illustration, a data message from a first IED to a second IED monitored at a certain location of the communication network represents valid behaviour only if the topology defines that the first IED communicates with the second IED and that the data messages pass the certain location at which the data message is monitored. For further illustration, a data message sent to an IED may represent valid behaviour only if it requests the IED to perform an action in accordance with its capabilities and functions. Such verifications may be formulated as a set of constraints. By using a set of constraints to define the system model, the process of verifying whether the monitored data messages correspond to valid behaviour may be performed efficiently.

The system model may thus provide a specification for at least the power utility automation system, including the communication network. The system model may provide a specification for both the utility automation system and the electric power system. The system model allows the monitoring system to monitor compliance with the specification as defined by the system model.

If a deviation from the behaviour expected according to the system model is detected, an alert is triggered. Deviations from the specified behaviour may not only be caused by security intrusions, but also by hardware faults, operator errors, timing problems, or configuration errors. Thus, the monitoring system is not only configured to detect security intrusions, but also any critical or incorrect state of the electric power system that can be observed through the communication network. The monitoring system is capable to monitor the "health" of the power utility automation system and to alert an operator if critical conditions occur.

The monitoring system may not only be used during normal operation of the electric power system, but may also be used during the configuration phase of the automation system. The method may accordingly comprise performing field or acceptance tests, in order to assess if the power utility automation system does or does not behave as specified in the configuration information. Alternatively or additionally, the method may be used to assess if the configuration information is correct and corresponds to the current state of the system. Alternatively or additionally, the method can be used to monitor the current status and to generate the configuration information from the current network traffic.

The evaluating step may comprise predicting anticipated data messages between the plurality of IEDs based on the system model, and comparing the monitored data messages to the predicted anticipated data messages. Knowledge on the electric power system and its power utility automation system as well as the specified behaviour of these systems is used to determine whether the electric power system and its power utility automation system exhibit a behaviour as expected according to the system model.

The prediction step may comprise predicting the data content of data messages transmitted by an IED based on the configuration information and based on at least one data message previously transmitted by at least one of the plurality of IEDs. The data content of a data message transmitted by an IED may be predicted based on the configuration information and based on the data content of another data message previously transmitted by the same IED. The data content of a data message transmitted by an IED may be predicted based on the configuration information and based on the data content of another data message previously transmitted by another IED of the plurality of IEDs. Thereby, knowledge on the components of the electric power system and its associated power utility automation system may be used in discriminating normal events from critical events.

The evaluation step may comprise: determining whether the plurality of IEDs behaves as specified by the configuration information. The critical event may be detected if the plurality of IEDs does not behave as specified by the configuration information. This verification can be done without requiring a blacklist of critical events.

The configuration information may also include information on components of the electric power systems and their interconnections. The evaluation step may comprise: determining whether both the electric power system and its power utility automation system behave as specified by the configuration information.

The monitoring system may have an Ethernet Test Access Port (TAP) to monitor the data messages. The monitoring system may have a plurality of TAPs to monitor the data messages. When the communication network has a star topology, as is the case for many switched communication networks, the plurality of TAPs may be respectively provided in the data connections between the IEDs and the switch. The TAPs may be situated in different locations all over the communication network and build a virtually distributed TAP.

Alternatively or additionally, the monitoring system may use a switch of the communication network to monitor the data messages. The monitoring system may have an interface which functions as a mirror port, and the switch may be configured to transmit a copy of data messages received at the switch from the plurality of IEDs to the mirror port at the monitoring system. Alternatively or additionally, the monitoring system may be integrated into a switch of the communication network.

The method may comprise a step of receiving, by the monitoring system, the configuration information. The method may comprise a step of automatically processing, by the monitoring system, the received configuration information to generate the system model.

The received configuration information may comprise at least one configuration data file of the electric power system and its power utility automation system. The configuration data file may be Substation Configuration description Language (SCL) file, as used for IEC 61850 compliant systems.

The SCL file may be the SCL file for a substation and its substation automation system.

The monitored properties may further comprise analogue signals of the electric power system. The evaluation step may comprise: evaluating both the monitored data messages and the analogue signals based on the configuration information to detect the critical event. The analogue signals may be compared against the specification of the electric power system and power utility automation system as defined by the SCL file.

The process for automatically creating a system model of the power utility automation system may combine information from different data sources. Configuration data of the electric power system and its automation system components may be used, such as SCL files, as defined in IEC 61850-6.

Additionally or alternatively, passive observation of network communication may also be used to generate the system model. Such passive observation may include observation of communication between devices of the power utility automation system and/or observation of communication between network equipment (e.g., Rapid Spanning Tree Protocol). Additionally or alternatively, active communication with devices (e.g. IEDs or network equipment) may also be used to generate the system model. Additionally or alternatively, configuration data of network switches may be used to generate the system mode. Such configuration data may include MAC tables of the switches. Alternatively or additionally, user input may be used. For illustration, a user input may be received which defines the location of sensors that provide analogue signals to input ports of the monitoring system.

In one implementation, the process for automatically creating a system model may start with the SCL files or other configuration data files to determine the internal data model of the devices of the power utility automation system. This can be used to deduce the device type, vendor information, and thus its capabilities. It can also be determined which devices will communicate with each other and which messages are to be expected at certain locations in the SAS. Since the function or purpose of a device is known, also its criticality can be deduced, which allows the generation of ACLs (Access Control Lists) for a device's data model.

This information may be combined with passive network monitoring to match the occurring traffic to the devices from the configuration file in order to fill in information gaps (e.g. location of a device in the network, addressing information). During the configuration phase of the communication network of the power utility automation system, the information generated from the configuration file can be compared to the currently existing traffic, in order to commission the network or to execute field or site acceptance tests.

Additionally, communication partners not mentioned in the configuration data file, such as human-machine interface stations, can be identified and specifications for these devices can be created (e.g., by prompting for user input).

The method may comprise a step of time-stamping the monitored properties and storing the time-stamped monitored properties in response to detecting the critical event. This allows the monitored properties to be subsequently analyzed. By selectively storing the time-stamped monitored properties only if a critical event is detected, storage space requirements may be kept more moderate.

The method may further comprise a step of generating, by the monitoring system, a blacklist which defines signatures of abnormal operation states. The monitored properties may be compared to the blacklist, in addition to verifying system behaviour against the configuration data, to detect the critical event. The monitoring system may generate the blacklist based on the configuration information.

The method may be used to detect an unauthorized intrusion. The monitoring system may thus operate as IDS. Alternatively or additionally, the method may be used to detect hardware failure. Alternatively or additionally, the method may be used to detect operator error. Alternatively or additionally, the method may be used to detect configuration error during a configuration phase of the substation or power utility automation system. Alternatively or additionally, the method may be used to detect a violation of security policies, such as establishment of a data connection between an unauthorized computing device and the power utility automation system.

The method may be used for monitoring and analyzing properties of an electric power system to detect and alert on critical operating states or security intrusions.

The monitored properties may include network traffic of an electric power system or an automation system. The analyzed network may include a communication network for transmitting power or automation system relevant data.

The monitoring system may monitor the state of the electric power system or power utility automation system by monitoring the network traffic and/or the available electric, analogue signals.

The monitoring system may operate as an intrusion detection system (IDS). The monitoring system may use power system application knowledge.

Analysis of the network traffic may comprise a passive analysis of the network traffic to determine if the electric power system or power utility automation system behaves according to the specification.

The monitoring system may report if the power utility automation system does or does not behave as specified by the system model of the power utility automation system.

The monitoring system may also report configuration errors in the configuration phase of the power or automation system.

The monitoring system may detect and report security intrusions based on knowledge of the power system. The decisions are taken considering the state of the power system, application specific data, specific behaviour patterns, and/or similar, without being limited thereto.

The monitoring system may detect and report operator errors and hardware failures of the power system. The collected information may be time-stamped and can be used to do post event analysis and debugging.

The monitoring system may combine blacklist (i.e. signature-based) and whitelist-based IDS approaches within one system, wherein the whitelist-based approach includes verification that the monitored data messages represent valid behaviour.

The monitoring system may be configured to automatically generate the system model for a whitelist-based IDS from configuration data of the power system. The configuration data may include SCL files, without being limited thereto.

The monitoring system may be configured to automatically generate the system model for a signature-based IDS from the configuration data of the power system. The configuration data may include SCL files, without being limited thereto.

According to another embodiment, a monitoring system for an electric power system is provided, the electric power system having a power utility automation system, the power utility automation system comprising a plurality of intelligent electronic devices (IEDs) communicating via a communication network. The monitoring system comprises an interface to monitor, during operation of the electric power system, properties of the electric power system, the monitored properties comprising monitored data messages which are transmitted by the plurality of IEDs over the communication network. The monitoring system comprises a processing device configured to evaluate the monitored data messages based on the configuration information to detect a critical event during operation of the electric power system. The processing device is configured to analyze data content of at least some of the monitored data messages to detect the critical event. The processing device is configured to generate an alert signal in response to detection of the critical event.

The monitoring system may be configured to perform the method of any one of aspect or embodiment.

The monitoring system may comprise a plurality of separate monitoring devices installed at different locations. The monitoring devices may be configured to communicate with each other. The monitoring system may thus be configured as a distributed system. In such a distributed implementation of the monitoring system, the distributed monitoring devices of the monitoring system may be synchronized by means of a synchronization protocol (such as IEEE 1588, PTP, IRIG-B, etc.).

Further features of the monitoring system and the effects attained thereby correspond to features of the method according to embodiments. The processing of configuration information and/or monitored properties may respectively be performed by the processing device of the monitoring system.

According to another embodiment, a system is provided which comprises an electric power system and the monitoring system of an aspect or embodiment.

The electric power system has a power utility automation system, the power utility automation system comprising a plurality of intelligent electronic devices (IEDs) communicating via a communication network.

Methods and monitoring systems of embodiments may in particular be used to monitor substation automation systems during operation of the substation. Methods and monitoring systems of embodiments may in particular be used to detect intrusions, without being limited thereto.

BRIEF DESCRIPTION OF DRAWINGS

Embodiments of the invention will be explained hereinbelow with reference to the drawings. Throughout the drawings, like reference numerals refer to like elements.

DESCRIPTION OF EMBODIMENTS

Embodiments of the invention will be described in more detail with reference to the drawings. While some of the embodiments will be described in specific contexts, such as substations of an electric power system which are transformers or power plants, the methods and monitoring systems are not limited to these contexts. Embodiments may be utilized in particular for monitoring operation, and in particular for detecting intrusions, in substations of electric power systems which have a power utility automation system in the form of a substation automation system.

Figure 1:
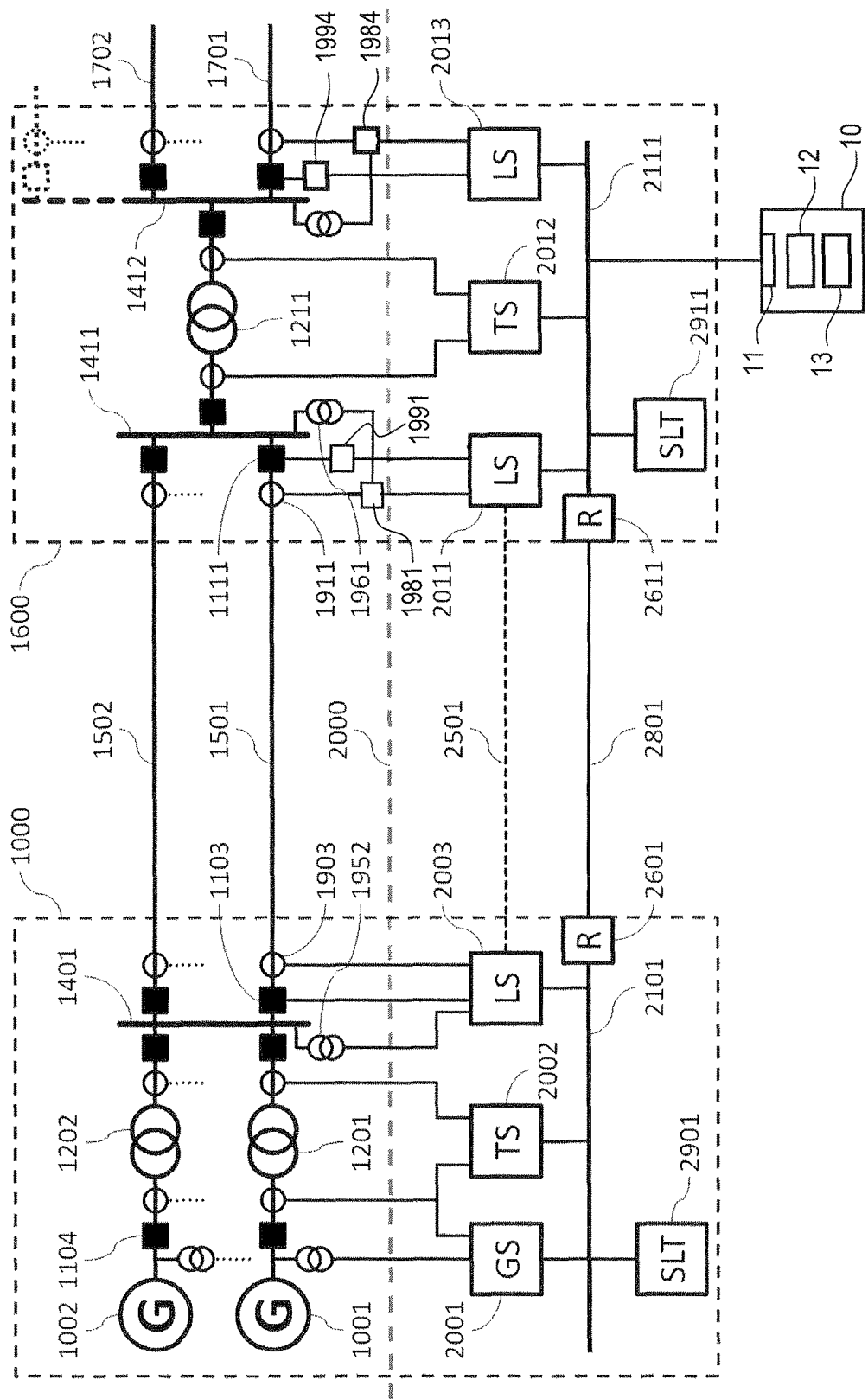
FIG. 1 shows, in diagrammatic form, elements of an electric power system in which a monitoring system and method of embodiments may be used.
Figure 2:
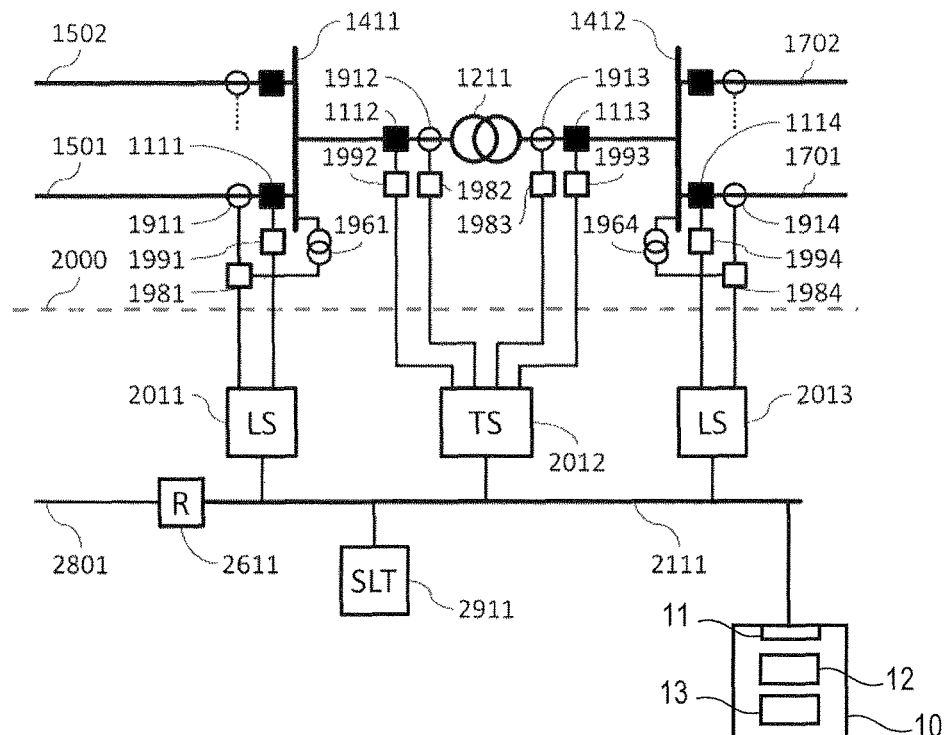
FIG. 2 shows, in diagrammatic form, a substation in which a monitoring system and method of embodiments may be used.
Figure 3:
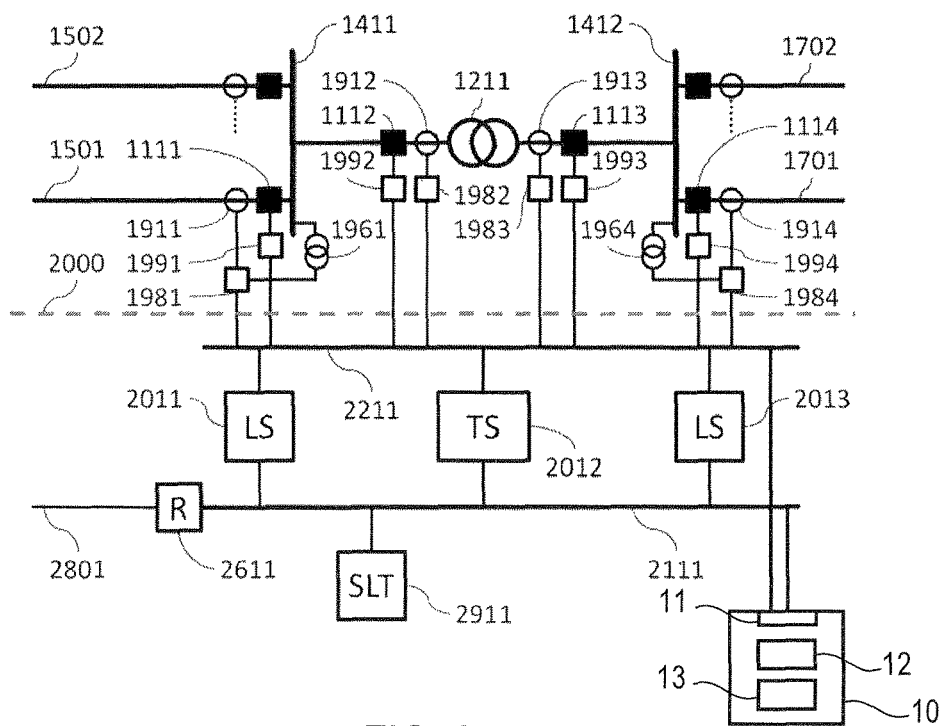
FIG. 3 shows, in diagrammatic form, yet a further exemplary substation in which a monitoring system and method of embodiments may be used.

FIG. 1 to FIG. 3 show in diagrammatic and highly simplified form fundamental components of an electric power system in which a monitoring system 10 of an embodiment may be used.

Generally, and as will be explained in more detail below, a monitoring system 10 of an embodiment comprises an interface 11 for communication with a communication network of a power utility automation system. Using the interface, data messages transmitted over the communication network are received and monitored. The monitoring system 10 comprises a processing device 12 which processes the monitored data messages. The processing device 12 may evaluate at least the data content of some of the monitored data messages, to determine whether the electric power system and its power utility automation system exhibit a behaviour which is in accordance with a system model 13 of the power utility automation system. The data content of the monitored data messages which is analyzed by the processing device 12 of the monitoring system 10 may include process parameters of electric power systems. The processing device 12 may comprise one processor, may comprise a plurality of processors which communicate with each other, or may include special circuits. For illustration, the processing device 12 may include a field programmable gate array (FGPA) or plural FGPAs communicating with each other. The processing device 12 may include one or plural digital signal processors (DSPs). The system model 13 may be stored in a storage device of the monitoring system 10. The system model 13 may be a system model which includes information on devices in at least the power utility automation system, the communication between these devices and the data structures of these devices. The system model 13 may be a system model which additionally includes information on primary elements of the electric power system. The monitoring system 10 may have additional features, such as input ports for receiving sensor data from the electric power system. The monitoring system 10 may also be configured to automatically generate the system model 13 based on a configuration file for a power utility automation system, e.g. based on an SCL data file.

FIG. 1 shows, in diagrammatic and highly simplified form, elements of an exemplary sub-system of an electric power system. The electric power flows in FIG. 1 from left to right, from a power plant 1000, a so-called "power station", via high-voltage transmission lines 1501, 1502 to a transformer plant 1600, a so-called "transformer station". The electric power is produced in generators 1001 and 1002 and transformed to high voltage in output transformers 1201 and 1202. Such output transformers associated with a generator are also called unit transformers or generator transformers. The power is passed from the unit transformers 1201, 1202 to a bus-bar 1401, from where it is distributed further on high-voltage transmission lines 1501, 1502. The high-voltage transmission line 1501, 1502 is here in the form of a double line. In practice, such a double line is in most cases guided jointly on a mast system. In the transformer plant 1600, the incoming lines 1501, 1502 are again combined at a bus-bar 1411. The electric power present at the bus-bar 1411 is transformed to a different voltage level by an output transformer 1211 and delivered to a bus-bar 1412. From the bus-bar 1412, the power is distributed further via lines 1701, 1702. FIG. 1 shows a so-called single-line equivalent circuit diagram. However, the electric power system is conventionally a three-phase system. Accordingly, the elements shown represent three-phase forms; for example, the line 1501 shown as one line in reality consists of three cables.

The production, transmission and distribution of the electric power accordingly takes place in the so-called primary elements described above, that is to say the primary elements guide the primary currents and primary voltages, which together are referred to as primary parameters. The primary elements together are also referred to as the primary system. Parallel to the primary system there is a further, so-called secondary system, which consists of protection and control devices. The elements above a symbolic dividing line 2000 in FIG. 1 belong to the primary system, while the elements below the dividing line 2000 belong to the secondary protection and control system. Transformers 1903, 1911, 1952 and 1961 occupy an intermediate position. They are connected, on the one hand, to the primary system and, on the other hand, to the secondary system and accordingly cannot be classified unequivocally.

Below the dividing line 2000, various protection devices are shown, for example a generator protection system (GS) 2001, a transformer differential protection system (TS) 2002, 2012 and a line protection system (LS) 2003, 2011, 2013. Only protection devices are shown in FIG. 1 in order to maintain clarity; control devices would be arranged at the same level. The protection and control devices cannot be connected directly to the high-voltage-carrying primary elements in order to acquire information about the parameters in the primary system. The transformers therefore deliver standardised images of the primary parameters, the so-called secondary parameters, to the protection and control devices. The ratios of the current transformers, e.g. 1903, 1911, are such that they deliver secondary currents of 1 A or 5 A when rated current is flowing in the primary system. The voltage transformers, e.g. 1952, 1961, deliver a secondary voltage of 100 V (in some parts of the world also 110 V, 115 V, 120 V) with rated voltage in the primary system.

Further elements of the primary system are also operated via the protection and control devices. In particular, when a fault is identified, the protection devices can activate circuit breakers, for example, and thus interrupt the current flow. In FIG. 1, this is shown by way of example for the two line protection devices 2003 and 2011 and their associated circuit breakers 1103 and 1111. There may be additional circuit breakers 1104. The circuit breakers 1103, 1111 can interrupt the current flow through the primary elements. This is also true in particular in the case of a fault, e.g. when fault currents flow that significantly exceed the normal operating currents. Isolation switches, which are likewise present in real installations, are not shown.

The protection devices evaluate the currents and voltages and, where appropriate, also further information from the primary and secondary system and determine whether a normal operating state or a fault is present. In the event of a fault, an installation part identified as being faulty is to be disconnected as quickly as possible by activating the corresponding circuit breakers. The protection devices may be specialised for different tasks. The generator protection system 2001, as well as evaluating the currents and voltages at the generator, also evaluates many further parameters. The transformer differential protection system 2002, 2012 applies Kirchhoff's nodal rule to the currents at the output transformer 1201, 1211. The line protection system 2003, 2011, 2013 may examine currents and voltages at the line ends and carries out an impedance measurement, for example. A bus-bar protection system (not shown), which can be used to protect the bus-bars 1401, 1411, 1412, may also be provided. Protection devices may be multifunctional, that is to say they can incorporate a plurality of protection functions and can also carry out control functions (combined protection and control devices).

More recently, intelligent electronic devices (IEDs) have become increasingly popular. As shown in the transformer plant 1600, IEDs 1981, 1984, 1991, and 1994 may be provided. These IEDs have access to the primary parameters and communicate with the protection and control devices via network protocols. The IEDs 1981, 1984, 1991, and 1994 may be connected as directly as possible to the primary elements. So-called merging units 1981, 1984 digitise the measured values from the current and voltage sensors 1961, 1964 and make them available to the protection devices as sampled values via a network interface. Intelligent control units 1991, 1994 detect the status of the primary elements and operate actuators in the primary elements. IEDs may communicate using a communication network. Communication between the IEDs may be made in accordance with a communication protocol. For illustration, the interconnection between the merging units 1981, 1984 and the line protection systems (LS) 2011, 2013 may be made through a communication network. Similarly, communication between other IEDs may be made over a communication network.

The system model 13 of the monitoring system may be generated based on configuration data for the IEDs of the power utility automation system. The system model 13 may include data models of the IEDs, for examples.

In operation of the electric power system, the monitoring system 10 monitors data messages transmitted by the IEDs. The data messages are digital data generated in accordance with a protocol, such as IEC 61850, without being limited thereto. The monitoring system 10 verifies, based on the system model 13, whether the power utility automation system shows an operation as expected according to the system model. If a deviation from the expected behaviour defined by the system model 13 is detected, an alert signal may be generated by the monitoring system 10.

Additional or alternative IEDs may be used in the power utility automation system, as illustrated in FIG. 2.

FIG. 2 shows a substation configured as a transformer plant, in which still more conventional interfaces have been replaced. To that end, IEDs 1981-1984, 1991-1994 which, on the one hand, have access to the primary parameters and, on the other hand, communicate with the protection and control devices via network protocols are provided. FIG. 2 shows such an architecture for the switching system of FIG. 1. Merging units 1981-1984 digitise the measured values from the current and voltage sensors 1911-1914, 1961, and 1964 and make them available to the protection devices as sampled values via a network interface. The sensors can be based on any desired physical principles. A standardised protocol between the merging unit and the protection device establishes interoperability. The sampled values can be, for example, sampled values according to standard IEC 61850 or according to the implementation guideline "Implementation Guideline for Digital Interface to Instrument Transformers using IEC 61850-9-2". The intelligent control units 1991-1994 detect statuses of the primary elements and operate actuators in the primary elements. FIG. 2 shows, by way of example, circuit breaker control devices in which the detected statuses are the switch setting and, for example, the instantaneous breaking capacity and the operated actuators are the trip coils and the switch drives. In order to transmit detected statuses to the protection and control devices or to receive commands from the protection and control devices, the intelligent control units likewise use protocols via network interfaces. Event-driven telegrams, whose information content is updated and transmitted only when the statuses and commands change, are suitable for the exchange of such information. Such event-driven telegrams can be, for example, so-called GOOSE messages according to standard IEC 61850.

While in FIG. 2 information is exchanged between the merging units 1981-1984 and the intelligent control units 1991-1994, on the one hand, and the protection and control devices 2011-2013, on the other hand, via point-to-point connections, FIG. 3 shows an architecture in which the information is collected and distributed via a further network 2211. The network 2211 is also called a "process bus", while a network 2111 is often also called a "station bus". The distinction between these networks (buses) and the nature of the exchanged information are not always entirely sharp and unequivocal. Thus, event-driven messages (GOOSE messages) can likewise expediently be used at the station bus, even in architectures according to FIG. 1. It is even possible for the process bus and the station bus to be merged in one physical network if the data traffic can be managed. In any event, more meaningful communication relationships are given by the network 2211 than can be established by the point-to-point connections of FIG. 2. New applications for protection and control functions are accordingly made possible. For example, the transformer protection system 2012 could examine the voltages at the bus-bars 1411 and 1412 via the sampled values from the merging units 1981 and 1984 and make the connection of the transformer 1211 dependent on their mutual phasing.

For the electric power systems and associated automation systems illustrated in FIG. 2 and FIG. 3, the monitoring system 10 may again monitor properties of the electric power system. The monitored properties may include data messages transmitted by IEDs. The monitoring system may be applied in the communication network of a power system as depicted in the example in FIG. 3, where the interface 11 of the monitoring system acts as a communication sensor. The communication sensor is coupled to the process bus 2211 and the station bus 2111. The system described here can use communication sensors to observe station bus and process bus communication. Additional sensors could monitor electrical signals, such as secondary parameters. The system model 13 of the monitoring system may be generated based on configuration data for the IEDs of the power utility automation system. The system model 13 may again include data models of the IEDs, for examples. In operation of the respective substation, the monitoring system 10 monitors data messages transmitted by the IEDs. The monitoring system 10 verifies, based on the system model 13, whether the power utility automation system shows an operation as expected according to the system model. If a deviation from the expected behaviour defined by the system model 13 is detected, an alert signal may be generated by the monitoring system 10. The monitoring system 10 can detect if the current status of the system corresponds to the system model.

Figure 4:
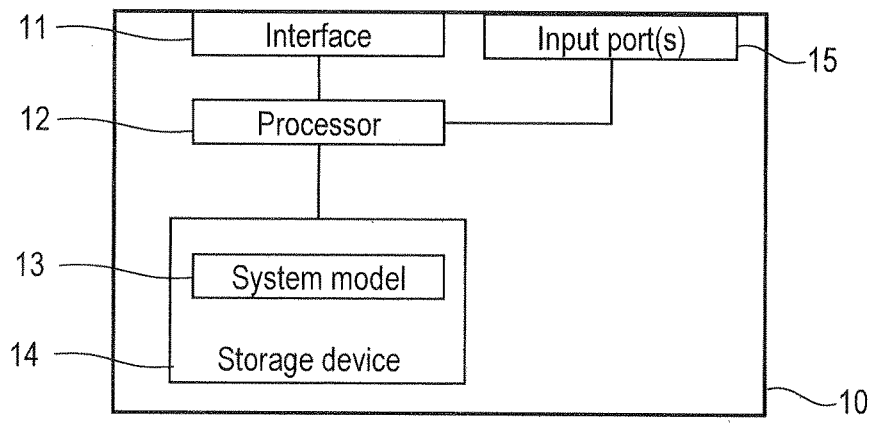
FIG. 4 is a block diagram of a monitoring system according to an embodiment.

FIG. 4 shows a schematic block diagram of a monitoring system 10 of an embodiment. The monitoring system 10 includes an interface 11 to receive data messages transmitted by an IED to another IED. The interface 10 may be a network interface. The monitoring system 10 comprises a processing device 12 which evaluates the monitored data messages and, optionally, other properties of the electric power system. Evaluation of the data messages includes evaluation of the data content of at least some of the monitored data messages. The data content includes process parameters of primary components of the electric power system. Thereby, the processing device 12 may determine whether the electric power system and the power utility automation system behave in accordance with the system model 13. If the monitoring system 10 detects a behaviour which is not in accordance with the system model 13, an alert signal may be generated.

The processing device 12 may use the system model 13 to determine whether the data content of two data messages transmitted by different IEDs of the power utility automation system is in agreement with the system model 13. The processing device 12 may put messages from different IEDs into relation with each other. For illustration, a process parameter of a primary element included in the data message transmitted by a first IED may be used to predict which value for another process parameter should be included in another data message transmitted by a second IED. Thereby, the deterministic behaviour of the electric power system and the power utility automation system may be used. A wide variety of other implementations may be used in which the monitoring system 10 uses configuration information of the power utility automation system to verify whether the monitored properties correspond to normal system behaviour or abnormal system behaviour. In the latter case, an alert signal may be triggered.

The processing device 12 may evaluate additional information to verify whether the electric power system and power utility automation system show a behaviour which is in accordance with the system model. For illustration, the monitoring system 10 may have one or several input ports 15 to receive analogue signals. These analogue signals of the power system may also be verified against the internal system model defined by the system model 13.

The system model 13 may be generated automatically based on the configuration information. The configuration information may be received by monitoring data messages between IEDs or may be included in at least one data file which is provided to the monitoring system. Other information may be used to generate the system model 13 based on the configuration information. In particular, application knowledge defining the operation of one or several communication protocol(s) used by the IEDs and/or on capabilities of different IEDs may be combined with the configuration information to generate the system model 13. The application knowledge may be stored in a database for use in generating the system model 13.

Figure 5:
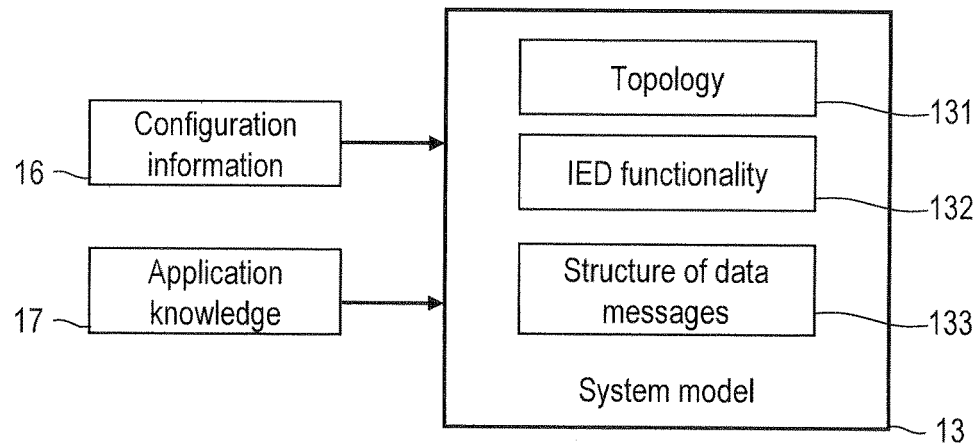
FIG. 5 is a block diagram illustrating the generation of a system model according to embodiments.

FIG. 5 illustrates generation of the system model. The monitoring system uses configuration information 16 and may combine the configuration information 16 with application knowledge 17 to generate the system model 13. The monitoring system may receive the configuration information 16 in any one of a variety of ways. For illustration, a configuration data file of the power utility automation system may be provided to the monitoring system as configuration information 16. Alternatively or additionally, the monitoring system may monitor data messages transmitted by IEDs during a configuration phase or during operation to thereby acquire the configuration information 16. The application knowledge 17 may include information on the communication protocol(s) that is or are used by the IEDs. The application knowledge 17 may also include information on device functionalities and capabilities, for each one of plural different IEDs. This information may be stored in the application knowledge 17 as a function of vendor and device identifier, for example.

The system model 13 may be generated such that it includes information 131 on logical interconnection between the IEDs. I.e., the system model may include information 131 on the topology of the power utility automation system. The system model may further include information on switches which are used in the communication network. This allows the monitoring system to determine which data messages are expected at certain locations within the communication network for valid behaviour of the power utility automation system. The system model 13 may include information 132 on the functionality and capabilities of at least the IEDs in the power utility automation system. The system model may include information 133 on the data messages transmitted by the IEDs.

The system model 13 may have a format which defines a set of constraints which are imposed onto valid behaviour of the power utility automation system by the configuration information and/or application knowledge. The set of constraints may include constraints relating to the data messages expected at a certain location of the communication network for the given topology of the power utility automation system. For illustration, a data message from a first IED to a second IED monitored at a certain location of the communication network represents valid behaviour only if the topology defines that the first IED communicates with the second IED and that the data messages pass the certain location at which the data message is monitored. For further illustration, a data message sent to an IED may represent valid behaviour only if it requests the IED to perform an action in accordance with its capabilities and functions. Such verifications may be formulated as a set of constraints. By using a set of constraints to define the system model, the process of verifying whether the monitored data messages correspond to valid behaviour may be performed efficiently.

For any data message which is identified as representing valid system behaviour, the data message may be analyzed based on a plurality of constraints. For illustration, the data message may be analyzed to determine whether it complies with a constraint relating to the system topology (e.g. that the data message is expected at the location where it was monitored), whether it complies with another constraint relating to IED functionality (e.g. that the receiving IED can actually perform the function requested by the data message), and whether it complies with yet another constraint relating to the structure of data messages (e.g. that the data content is in conformity with the communication protocol). The data content of the data message may be used to determine whether the data message complies with the constraint relating to IED functionality and the constraint relating to the structure of data messages. More than three constraints may be used to analyze the data message.

The system model 13 may be generated such that it defines a set of constraints which are used to verify whether the monitored data message is in conformity with the constraints.

While a monitoring system 10 implemented as a single device is illustrated in FIG. 4, the operation of the monitoring system 10 may also be implemented in a distributed system which comprises plural separate physical devices. The plural devices may be installed at various locations in the power utility automation system, helping to monitor different traffic views of the network. The distributed devices may be synchronized to each other, and ideally also to the electric power system or substation. The distributed devices of the monitoring system may communicate via the communication network of the monitoring system. The distributed devices of the monitoring system may be synchronized with each other and the power utility automation system by any suitable protocol, such as IEEE 1588, pulse per second-techniques, or IRIG-B. A clock device which generates a clock signal may be the substation clock device, for example. Fault analysis is facilitated using such synchronization. Further, time ordering used in identifying valid system behaviour is attained.

Process bus and station bus networks do not need to be physical bus topologies, but may frequently be physical star topologies built using network switches. In this case, communication sensors of the monitoring system may be applied by using an Ethernet Test Access Port (TAP) or by configuring automation network switches to send a copy of all network traffic to a mirror port. The interface 11 of the monitoring system may be connected at the mirror port.

Figure 6:
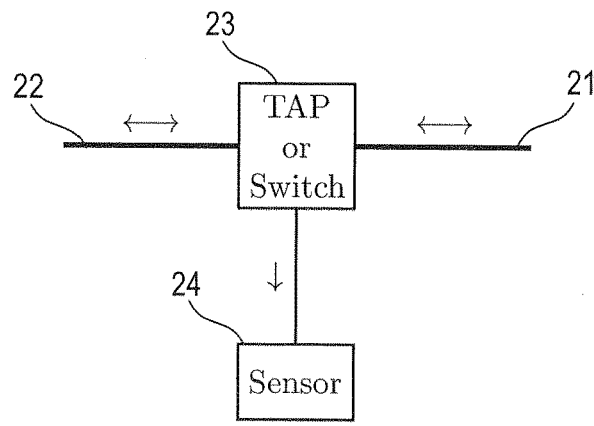
FIG. 6 shows a technique by which a monitoring system of an embodiment may monitor data messages transmitted by devices of a power utility automation system.

FIG. 6 illustrates such a configuration. The TAP or Switch 23 is provided on network lines 21, 22. The network lines 21, 22 may be lines of a process bus or of a station bus. The TAP or Switch 23 sends a copy of all network traffic to the communication sensor 24, which is a mirror port for the network traffic. The communication sensor 24 may be the interface 11 or may be connected to the interface 11 of the monitoring system 10.

Other embodiments may directly implement a network switch or TAP functionality within one device to be able to observe network traffic without a separate TAP. I.e., the operation of the monitoring system 11 may be integrated into a switch of the process bus or station bus network. Several such network switch or TAP devices which have integrated functions for monitoring the operation of the power utility automation system may be used. These devices may be synchronized with each other.

Since not all network traffic can be accessed from a single location, different physical devices of the monitoring system or its sensors may also be applied multiple times within one electric power system. The deployed devices may then cooperate to form a distributed monitoring system.

Figure 7:
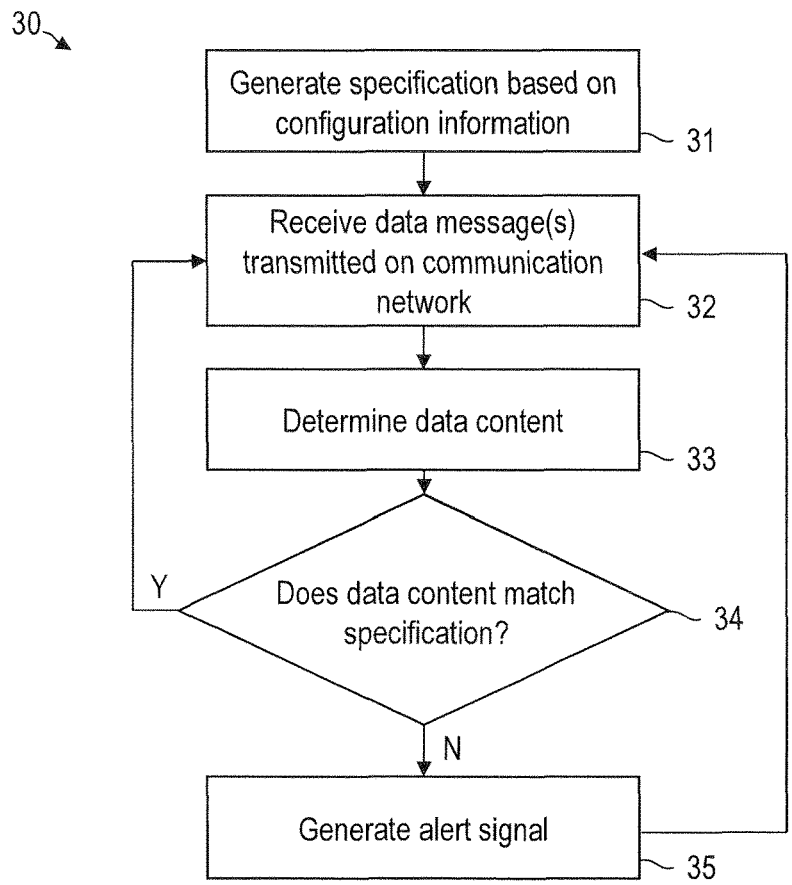
FIG. 7 is a flow chart of a method of an embodiment.

FIG. 7 is a flow chart of a method 30 of an embodiment. The method 30 may be automatically performed using a monitoring system of an embodiment. The method 30 may be performed to detect critical events during operation of an electric power system and its power utility automation system.

At step 31, a system model of at least the power utility automation system is generated. The system model may be based on configuration information for a plurality of IEDs of the power utility automation system. The system model may further also define primary elements of the electric power system. The system model may be a system model which describes the behaviour of the power utility automation system.

The monitoring system may generate the system model automatically and based on a configuration file of the power utility automation system. The step 31 for automatically creating the system model of the power utility automation system may combine information from different data sources, such as, but not limited to:

Configuration data of the power system and its automation system components (such as SCL files, as defined in IEC 61850-6);
Passive observation of network communication, such as communication between automation system devices and/or communication between network equipment (e.g., Rapid Spanning Tree Protocol);
Active communication with devices (e.g. IEDs or network equipment);
Configuration data of network switches (if accessible, e.g., MAC tables); or
User input.

In some implementations, the step 31 of automatically creating the system model of the power utility automation system may start with the SCL files or other configuration files to determine the internal data model of the IEDs. This can be used to deduce the device type, vendor information, and thus its capabilities. Table lookup may be used to deduce the device type or other similar information based on the configuration file. The monitoring system may also determine which devices will communicate with each other and which messages are to be expected at certain locations in the SAS. Since the function and purpose of an IED is known, also its criticality can be deduced, which allows the generation of ACLs (Access Control Lists) for a device's data model.

This information can be combined with passive network monitoring to match the occurring traffic to the IEDs from the configuration file in order to fill in information gaps (e.g. location of a device in the network, addressing information). During the configuration phase of the SAS network, the information generated from the configuration file can be compared to the currently existing traffic, in order to commission the network or to execute field or site acceptance tests. User input may define additional configuration of the electric power network or power utility automation system which is not included in the configuration file. For illustration, communication partners not mentioned in the configuration file, such as human-machine interface stations, can be identified and specifications for these devices can be created by dedicated user input.

The generation of the system model at step 31 may also be performed differently. For illustration, passive network monitoring during a configuration phase may be used to generate the system model without requiring the configuration files.

At 32, data messages transmitted by IEDs on the communication network are retrieved. For a communication network having a star topology, this can be done using any one of the techniques described with reference to FIG. 6.

At 33, the data content of the data messages is determined. The data content may include information different from address information of the transmitting and receiving IED. The data content may include a process parameter of a primary element of the electric power system.

At 34, it is determined whether the data content matches the system model. If the data content matches the system model, the system behaviour is determined to be normal. The method reverts to the monitoring at step 32. Otherwise, an alert signal is generated at step 35. The method may then return to step 32 to continue the monitoring.

Additional information may be evaluated in the monitoring method of FIG. 7. For illustration, analogue values received by the monitoring system at analogue input ports may also be evaluated to determine whether they are in conformity with the behaviour expected according to the system specification.

The monitoring systems and monitoring methods of embodiments may analyze the content of the transferred messages and may put messages of different sources into relation.

Figure 8:
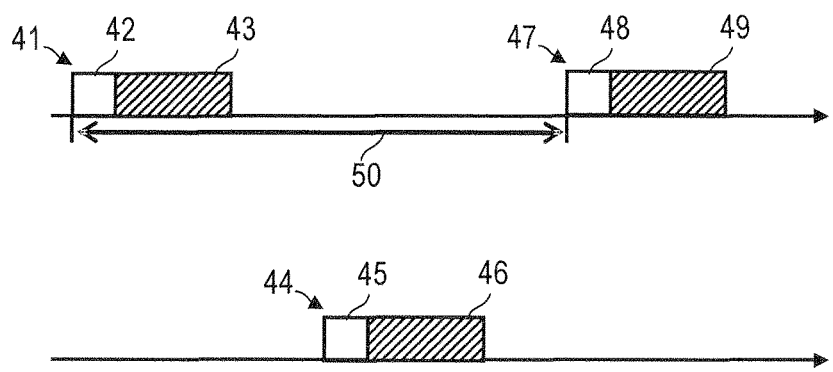
FIG. 8 illustrates data messages transmitted by devices of a power utility automation system which are evaluated by a monitoring system of an embodiment.

FIG. 8 illustrates data messages 41, 44, and 47 monitored by the monitoring system of an embodiment. Data messages 41 and 47 are transmitted by an IED of the automation system. Data message 44 is transmitted by another IED. Data message 41 includes header data 42, which may include an identifier for the transmitting and receiving IED. Data message 41 further includes data content 43. Similarly, data message 44 includes header data 45, which may include an identifier for the transmitting and receiving IED. Data message 44 further includes data content 46. Data message 47 includes header data 48, which may include an identifier for the transmitting and receiving IED. Data message 47 further includes data content 49.

The data content 43, 46, and 49 of the data messages may respectively relate to process parameters of the electric power system. For illustration, the data content of some data messages may include digitally transferred measurement values, e.g. voltages, signal waveforms, binary signals, or trigger events.

The monitoring systems and methods of any embodiment may use the data content 43 of a data message 41 transmitted by an IED to determine whether the data content 46 of the data message 44 transmitted by another IED corresponds to valid system behaviour. The system model is used to set the data content 43, 46 of the data messages 41, 44 transmitted by different IEDs in relation to each other. Similarly, the data content 46 of the data message 44 may be used to determine whether the data content 49 of the data message 47 corresponds to valid system behaviour.

The monitoring systems and methods of embodiments may not only use data content, but additionally also timing of data transmissions to verify whether the system behaviour is normal, i.e., that no critical event has occurred. For illustration, the rate at which an IED transmits data messages may depend on the value of a process parameter. The transmission rates for various process parameter values or ranges of process parameter values may be included in the configuration data for the respective IED, which is used to generate the system model. This allows the monitoring systems and methods to also identify critical events based on the timing of transmitted data messages, when the timing is evaluated based on the system model and the data content of a data message transmitted by an IED.

Reverting to FIG. 8, a time interval 50 or transmission rate at which an IED transmits the data messages 41 and 47 may vary depending on a process parameter of the electric power system. The monitoring system may determine a value of the process parameter based on the data content of a data message transmitted by one of the IEDs. The monitoring system may use the system model to determine at which time intervals 50 data messages should be transmitted for this value of the process parameter. The monitoring system may verify whether the data messages 41 and 47 are transmitted at the expected timing. Based on this, it may be determined whether the system is in its normal operation state.

The monitoring systems and methods of embodiments may use blacklist-type approaches to detect critical events, in addition to a verification of normal system behaviour based on the system model of the power utility automation system. This may be beneficial in particular when the substation automation system uses also classical IT protocols and technologies. These often exhibit non-deterministic behaviour that can not be specified in sufficient detail. Monitoring systems and methods of embodiments may thus additionally use traditional blacklist-based intrusion detection methods to detect security attacks targeted on those classical IT technologies.

Figure 9:
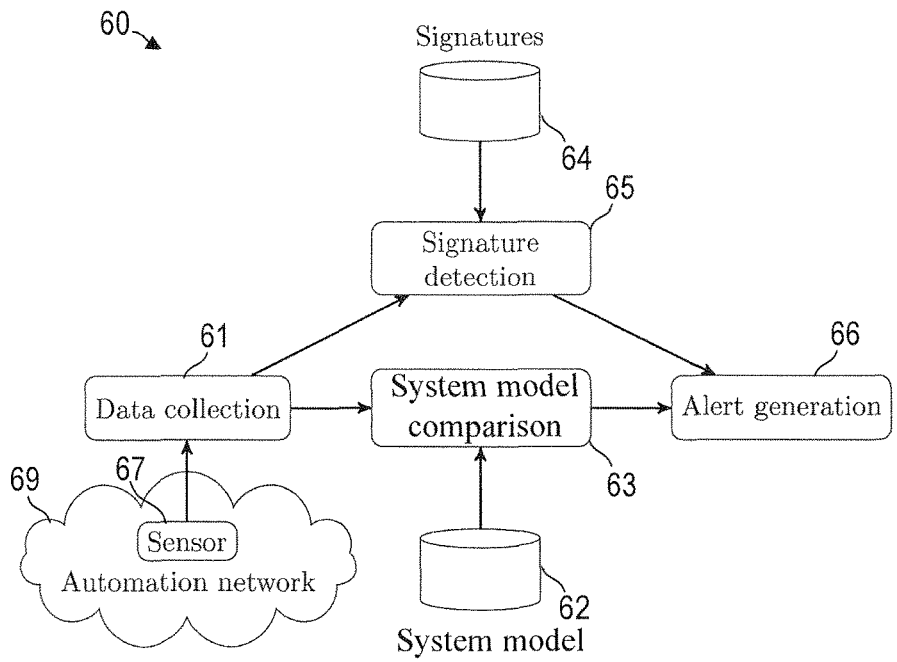
FIG. 9 illustrates a functional block diagram of a monitoring system of an embodiment.
Figure 10:
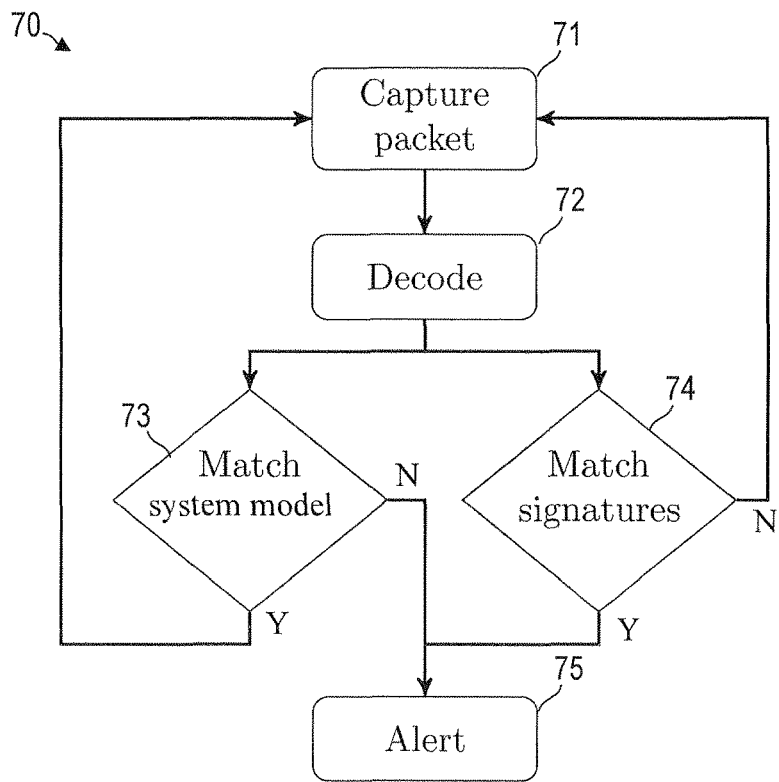
FIG. 10 illustrates a flow chart of a method of an embodiment.

FIG. 9 outlines the logical structure of such a monitoring system, and FIG. 10 is a flow chart of a method performed by such a monitoring system.

FIG. 9 shows a functional block diagram of a monitoring system 60 of an embodiment. The monitoring system 60 generally operates based on a system model 62 of the power utility automation system and based on signatures 64 of critical events. Intrusions are one example for critical events for which signatures 64 may be stored. The signatures 64 may form a blacklist, such that a critical event is detected and an alert is triggered when one of the signatures 64 is observed in the power utility automation system.

The monitoring system 60 has a data collection component 61. The data collection component 61 may receive data messages transmitted by IEDs. These data messages may be retrieved using a communication sensor 67 installed in or coupled to the communication network 69 of the automation system. The data collection component 61 may also collect analogue signals received at analogue input ports of the monitoring system.

The monitoring system 60 has a system model comparison component 63 which compares monitored properties of the electric power system to the behaviour expected in accordance with the system model 62. If it is detected that the electric power system does not show a behaviour expected according to the system model 62, an alert generation component 66 generates an alert. The operation of the system model comparison component 63 may operate as described with reference to any one of the other embodiments herein.

The monitoring system 60 has a signature detection component 63 which compares signatures, e.g. data content in one or several data messages, to the stored signatures 64. If a match is detected, the alert generation component 66 generates an alert.

The signatures 64 may be provided to the monitoring system from an external network. The signatures 64 may include signatures of intrusions for IT protocols which are used in the IT components of the power utility automation system. Such signatures may be independent of the system model 62.

In another implementation, the signatures 64 may include signatures of critical events which are generated based on the system model 62. In this case, the monitoring system may generate the signatures 64 automatically based on configuration information for IEDs of the automation system, for example.

FIG. 10 is a flow chart of a method 70 of an embodiment. The method 70 may be performed by a monitoring system which also uses signatures of critical events, such as the monitoring system 60 of FIG. 9.

At step 71, a packet is captured. The packet may be a data message transmitted by an IED of the automation system. At 72, the packet is decoded. Decoding the packet may include retrieving data content from the data message. The decoding may include reading a digitally transmitted process parameter from the data message.

At step 73, it is determined whether the monitored data message matches the system model. This may be implemented as explained with reference to any one of the embodiments of FIG. 1 to FIG. 8. If the monitored data message matches the system model, the method may revert to step 71. Otherwise, an alert signal is generated at step 75.

At step 74, it is determined whether the monitored data message matches one of the signatures of critical events. These signatures may include signatures for intrusions. If there is a match, an alert signal is generated at step 75. Otherwise, the method may revert to step 71.

Monitoring systems of embodiments may have any one of a variety of configurations. For illustration, the monitoring system may be integrated into another device, such as a switch of the communication network. Alternatively or additionally, the monitoring system may be a distributed monitoring system which has plural monitoring devices distributed over the communication network. For illustration rather than limitation, some configurations will be explained with reference to FIG. 11 to FIG. 13. In each one of these configurations, the monitoring system may operate as described above, by verifying whether data content of data message(s) represents valid system behaviour as defined by a system model.

Figure 11:
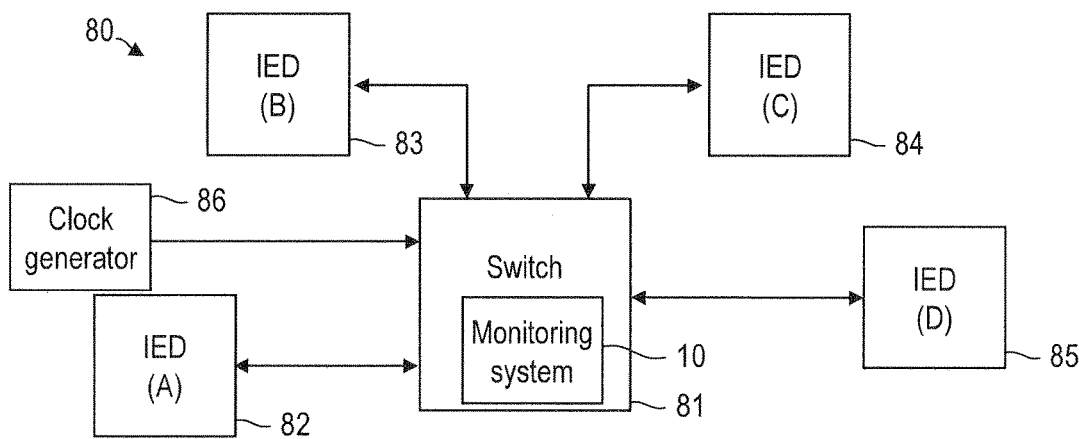
FIG. 11 illustrates a power utility automation system having a monitoring system according to an embodiment.
Figure 12:
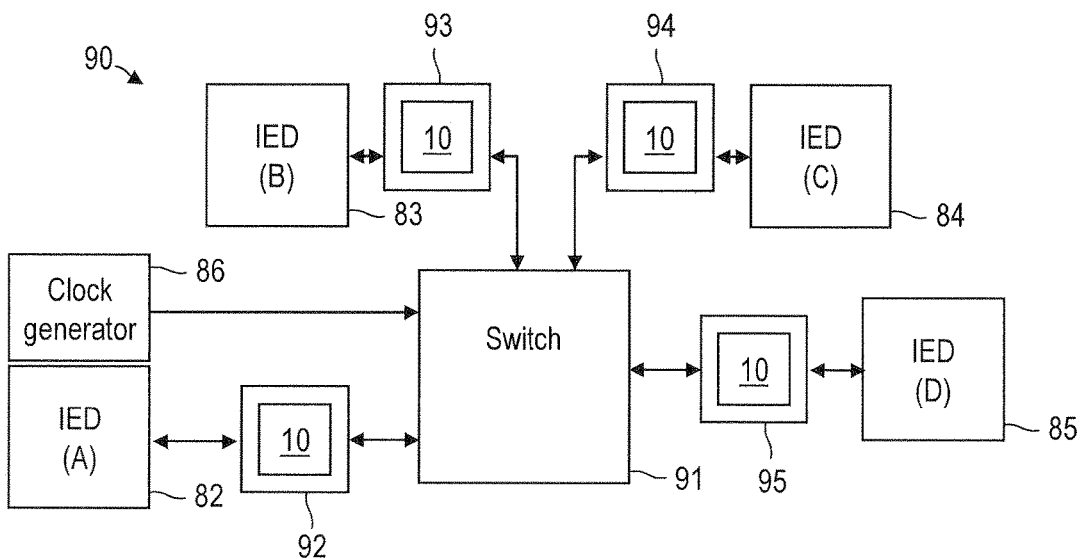
FIG. 12 illustrates a power utility automation system having a monitoring system according to another embodiment.
Figure 13:
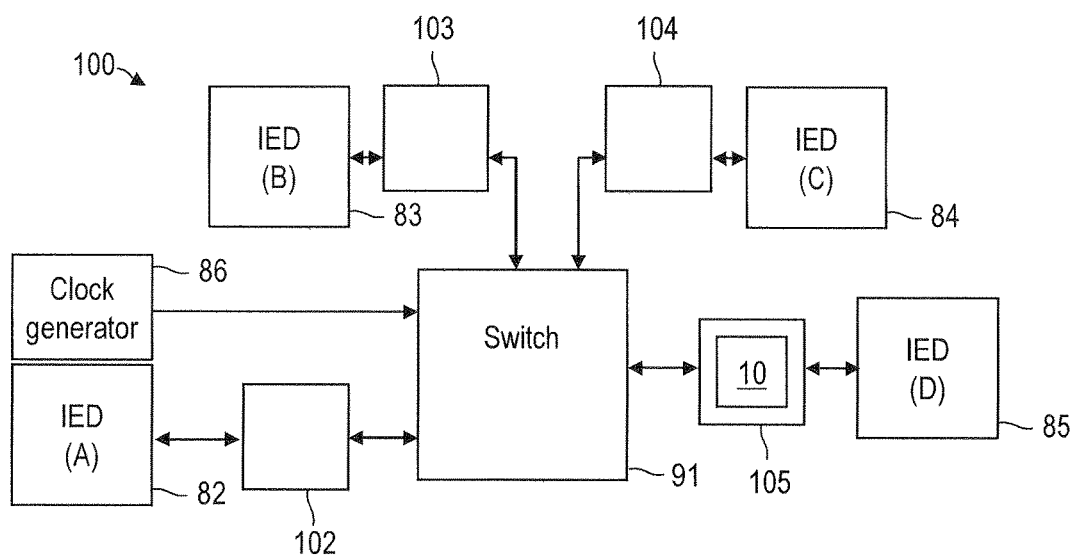
FIG. 13 illustrates a power utility automation system having a monitoring system according to another embodiment.

FIG. 11 to FIG. 13 respectively shows a power utility automation system with a plurality of IEDs 82-85. The IEDs 82-85 communicate with each other over a communication network. The communication network may be a switched communication network. The communication network may have a star topology. One switch or several switches may be used in the communication network. A clock generator 86 may be used to generate synchronization signals for synchronizing the IEDs 82-85. Further, the clock generator 86 may also be used to synchronize the monitoring system 10 with the IEDs 82-85.

FIG. 11 shows a power utility automation system 80 according to an embodiment. In the power utility automation system 80, the monitoring system 10 is integrated into the switch 81. If the communication network has several switches, the monitoring system 10 may be integrated into one of the switches or may be distributed over several switches.

FIG. 12 shows a power utility automation system 90 according to another embodiment. In the power utility automation system 90, the monitoring system includes a plurality of monitoring devices 92-95 installed at different locations. For illustration, a first monitoring device 92 may be a first TAP installed between the IED 82 and the switch 91. A second monitoring device 93 may be a second TAP installed between another IED 83 and the switch 91. In the implementation of FIG. 12, each one of the monitoring devices 92-95 may include the full system model 13. Each one of the monitoring devices 92-95 may thus have full knowledge of valid system behaviour. Each one of the monitoring devices 92-95 may determine whether the data messages received at the respective TAP are in conformity with the system model. The monitoring devices 92-95 may communicate with each other over the communication network. For illustration, if a first one of the monitoring devices 92-95 uses data content of a data message received at a second one of the monitoring devices 92-95 to verify whether the power utility automation system 90 shows valid behaviour, the second one of the monitoring devices may notify the first one of the monitoring devices of this data content.

FIG. 13 shows a power utility automation system 100 according to another embodiment. In the power utility automation system 100, the monitoring system includes a plurality of TAPs 102-104 installed at different locations and operative to receive data messages. For illustration, a first TAP 102 may be installed between the IED 82 and the switch 101. A second TAP 103 may be installed between another IED 83 and the switch 101. The TAPs 102-104 may respectively forward the received data messages to a monitoring device 105 which includes the system model and evaluates the data messages received at any one of the TAPs 102-104. The TAPs 102-104 serve as communication sensors for the monitoring device 105. The monitoring device 105 may be integrated into another TAP 105 or may be a separate device. In the implementation of FIG. 13, not all of the devices 102-105 need to store the full system model 13. For illustration, only the monitoring device 105 or only some of the monitoring devices may have full knowledge of valid system behaviour.

The monitoring device(s) 105 which stores the system model to verify whether the power utility automation system 100 shows valid behaviour.

Various other configurations may be used. For illustration, the monitoring system may have more than one monitoring device which stores the system model.

While monitoring systems and methods according to embodiments have been described with reference to the drawings, modifications may be implemented in other embodiments. For illustration, while some embodiments have been described in the context of intrusion detection, methods and systems of embodiments may also be used to detect component error, operator error or other critical events in electric power systems.

The invention claimed is:

1. A method of monitoring an electric power system comprising a power utility automation system, the power utility automation system comprising a plurality of intelligent electronic devices (IEDs) communicating via a communication network, the method comprising:

generating, by a monitoring system, a system model for the electric power system and the power utility automation system based on configuration information which includes at least one substation configuration description language file (SCL);

monitoring, by the monitoring system during operation of the electric power system, properties of the electric power system, the monitored properties comprising monitored data messages which are transmitted by the plurality of IEDs over the communication network;

evaluating, by the monitoring system, the monitored data messages based on the configuration information to detect a critical event during operation of the electric power system by analyzing a payload data content of at least some of the monitored data messages which includes a process parameter of a primary element of the electric power system; and determining, by the monitoring system based on the configuration information, whether the payload data content corresponds to a valid behavior of at least one of the electric power system or the power utility automation system by predicting in real-time the payload data content of anticipated data messages between the plurality of IEDs based on the system model, and comparing the monitored data messages to the predicted anticipated data messages, wherein the predicting comprises using the system model and the process parameter of the primary element included in the data message transmitted by a first IED to predict which value for another process parameter should be included in another data message transmitted by a second IED.

2. The method of claim 1,
wherein the evaluating comprises: determining whether the plurality of IEDs behaves as specified by the configuration information,
wherein the critical event is detected if the plurality of IEDs does not behave as specified by the configuration information.

3. The method of claim 2,
wherein the evaluating comprises: determining whether both the electric power system and its power utility automation system behave as specified by the configuration information.

4. The method of claim 1,
wherein the monitoring system has an Ethernet Test Access Port (TAP) to monitor the data messages.

5. The method of claim 1,
wherein the monitoring system uses a switch of the communication network to monitor the data messages.

6. The method of claim 1, the method further comprising:
receiving, by the monitoring system, at least one configuration data file, in particular an SCL file, of the electric power system and its power utility automation system.

7. The method of claim 1,
wherein the monitored properties further comprise analogue signals of the electric power system, and
wherein the evaluating comprises: evaluating both the monitored data messages and the analogue signals based on the configuration information to detect the critical event.

8. The method of claim 1,
wherein the monitoring system is a distributed monitoring system comprising a plurality of monitoring devices, the plurality of monitoring devices being installed so as to be distributed over the communication network, the plurality of monitoring devices being synchronized with each other and the power utility automation system.

9. The method of claim 1, further comprising:
generating, by the monitoring system, a blacklist which defines signatures of abnormal operation states, wherein the monitoring system generates the blacklist based on the configuration information, and
comparing the monitored properties to the blacklist to detect the critical event, so that the monitoring system uses both the valid system behavior determined based on the configuration information and the blacklist to detect the critical event.

10. A monitoring system that monitors an electric power system comprising a plurality of intelligent electronic devices (IEDs) communicating via a communication network and, a power utility automation system, the monitoring system comprising:
a processing device configured to perform the following operations:
generating a system model for the electric power system and the power utility automation system based on configuration information which includes at least one substation configuration description language file (SCL),
monitoring, during operation of the electric power system, properties of the electric power system, the monitored properties comprising monitored data messages which are transmitted by the plurality of IEDs over the communication network,
evaluating the monitored data messages based on the configuration information to detect a critical event during operation of the electric power system by analyzing a payload data content of at least some of the monitored data messages which includes a process parameter of a primary element of the electric power system, and
determining, based on the configuration information, whether the payload data content corresponds to a valid behavior of at least one of the electric power system or the power utility automation system by predicting in real-time the payload data content of anticipated data messages between the plurality of IEDs based on the system model, and comparing the monitored data messages to the predicted anticipated data messages,
wherein the predicting comprises using the system model and the process parameter of the primary element included in a data message transmitted by a first IED to predict which value for another process parameter should be included in another data message transmitted by a second IED.

* * * * *